United States Patent

Philpot

[11] Patent Number: 6,055,762
[45] Date of Patent: May 2, 2000

[54] COMBINED BOAT HOOK AND BILGE PUMP

[76] Inventor: Terry Philpot, 1532 Chemong Road, RR#1 Peterborough, Ontario, Canada, K9J 6X2

[21] Appl. No.: 09/071,660

[22] Filed: May 1, 1998

[51] Int. Cl.$^7$ .................................................. A01K 77/00
[52] U.S. Cl. ...................................... 43/11; 92/23; 92/163
[58] Field of Search .................. 417/234; 92/23, 92/163; 43/11, 12

[56] References Cited

U.S. PATENT DOCUMENTS

| | | | |
|---|---|---|---|
| D. 330,537 | 10/1992 | Scott | D12/317 |
| 2,915,986 | 12/1959 | Sissonon | 103/178 |
| 3,040,693 | 6/1962 | Bunker | 440/101 |
| 3,165,067 | 1/1965 | Greenwald | 440/101 |
| 4,193,517 | 3/1980 | Fetty | 222/78 |
| 4,369,109 | 1/1983 | Edge | 210/169 |
| 4,619,065 | 10/1986 | Jones | 43/11 |
| 4,653,214 | 3/1987 | Cline | 43/14 |
| 4,688,643 | 8/1987 | Carter | 169/33 |
| 4,810,029 | 3/1989 | Kaladis et al. | 297/16.2 |
| 4,850,826 | 7/1989 | Detlefsen | 417/555.1 |
| 4,913,078 | 4/1990 | Haverly | 114/221 R |
| 4,986,207 | 1/1991 | Reed | 114/221 R |
| 5,003,437 | 3/1991 | Barrett | 362/109 |
| 5,003,907 | 4/1991 | Roach | 114/221 R |
| 5,163,778 | 11/1992 | Botero | 440/101 |
| 5,322,462 | 6/1994 | Hull et al. | 440/101 |
| 5,845,796 | 12/1998 | Miller | 213/49 |
| 5,902,162 | 5/1999 | Kot et al. | 440/101 |

*Primary Examiner*—Charles G. Freay
*Assistant Examiner*—Robert Z. Evora
*Attorney, Agent, or Firm*—Richard J. Hicks

[57] ABSTRACT

A combination telescopic boat hook/bilge pump which includes a novel locking device is described. The inner tube is provided with a washer at the proximal end which acts with the outer tube as a piston. The ball tip distal end of the boat hook is provided with an axial bore so that water can be sucked into the outer tube for subsequent discharge. For use as a boat hook the inner tube is extended until a pair of spring loaded pins mounted in the inner tube at the proximal end thereof releasably engage any two of three circumferential slots provided adjacent the proximal end of the outer tube so as to provide an extended rigid shaft.

11 Claims, 2 Drawing Sheets

COMBINED BOAT HOOK AND BILGE PUMP

FIELD OF THE INVENTION

This invention relates to a combination telescoping tubular boat hook and bilge pump, which is lockable into an extended position regardless of the axial orientation of the tubes.

BACKGROUND OF INVENTION

Boat hooks having either a rigid tubular, or solid shaft or a telescoping shaft are well known in the field of boating accessories. Similarly manual bilge pumps, and time inflations, which incorporate a piston sliding in an elongated shaft are also well known. Heretofore, however, a combination boat hook and bilge pump has not been described. In small boats, where storage space is at a premium, and where bilges are frequently only accessible through small, narrow openings, a long thin bilge pump is often a necessity but there is little or no space to store such a piece of equipment. A boat hook is, of course, generally considered to be an essential piece of equipment and it would clearly be advantageous to combine a bilge pump with the boat hook for ease of storage and accessibility. The problem, however, is that a boat hook requires a rigid shaft of preselected length whereas a bilge pump requires a fixed tubular shaft having a reciprocating piston slideably therein.

OBJECT OF THE INVENTION

It is an object of the present invention to provide a telescoping tubular boat hook having a reciprocating piston portion slidable within the tubular shaft to act as a bilge pump, but in which the piston portion can be locked against the tubular shaft, in an extended position for use as a boat hook.

Another object of the invention is to provide a spring loaded locking device adapted so as to ensure instant locking when the piston is moved to the extended position regardless of the relative axial orientation of the tubular shaft and the piston portion.

BRIEF STATEMENT OF INVENTION

By one aspect of this invention, there is provided a means for securing a pair of telescoping, longitudinally extending, coaxial inner and outer tubular members into a releasable locked position relative to each other comprising: at least one set of three circumferentially arranged slots at a selected position along the length of said outer tubular members, and a pair of radially extendable spring loaded pin members mounted adjacent one end of said inner tubular member and contained within said outer tubular member, such that when said pin members and said slots are in overlying relationship, each of said pair of pin members extends through one of said set of three slots, in any axial orientation of said tubular members.

By another aspect of this invention, there is provided a combination telescopic boat hook and bilge pump comprising: a first tubular longitudinally extending shaft member having hook and nozzle means at a first end thereof; a second tubular longitudinally extending shaft member coaxially mounted in said first tubular member for sliding movement between a first, retracted, position within said first tubular member, and a second position extended from said first tubular member, and having piston means secured to a first end thereof and contained within said first tubular member; said nozzle means, said first tubular member and said piston means defining a variable volume fluid flow path; first tubular member having a set of three equally spaced circumferentially extending slots at a selected position adjacent a second end thereof and said second tubular member having a pair of spring loaded pin members extendable radially outwardly from a position adjacent said piston means, so that when said pair of pin means is moved into overlying relationship with said set of said circumferential slots, said pair of pins extend radially outwardly through two of said set of three slots, in any axial orientation of said first and second tubular members, to thereby lock said tubular members into a releasable rigid position.

DETAILED DESCRIPTION OF PREFERRED EMBODIMENTS

Figure 1:
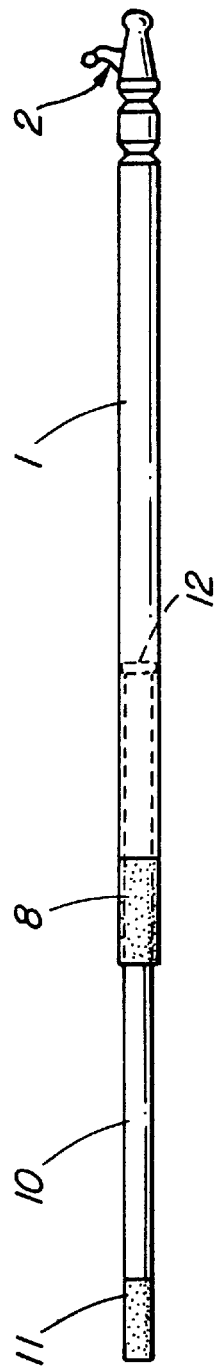
FIG. 1 is a side view of the boat hook/bilge pump combination of one embodiment of the present invention.
Figure 2:
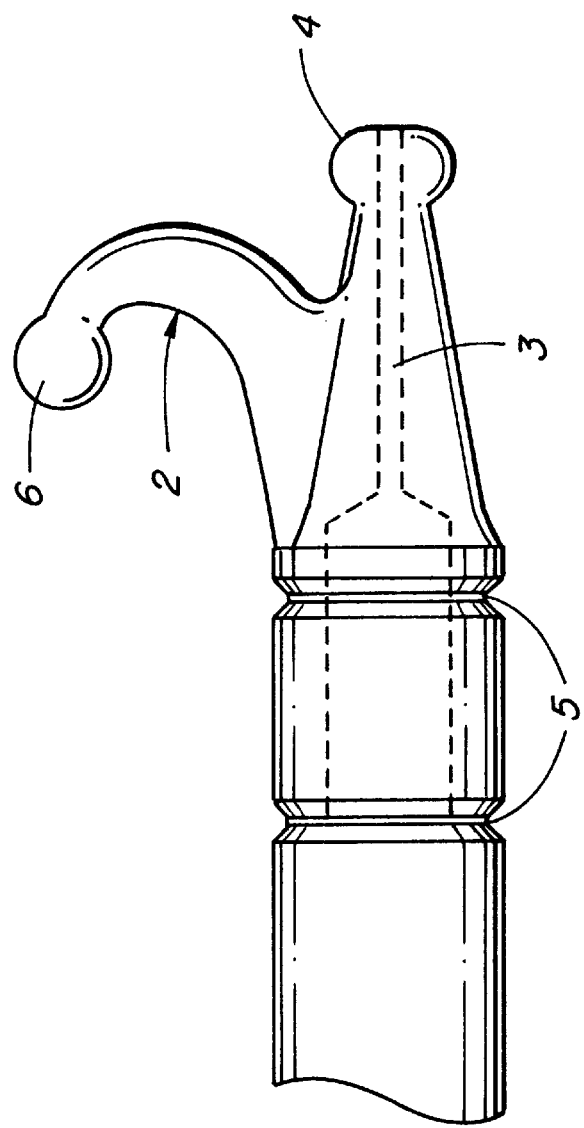
FIG. 2 is an enlarged sectional view of the hook end of the embodiment of FIG. 1.
Figure 3:
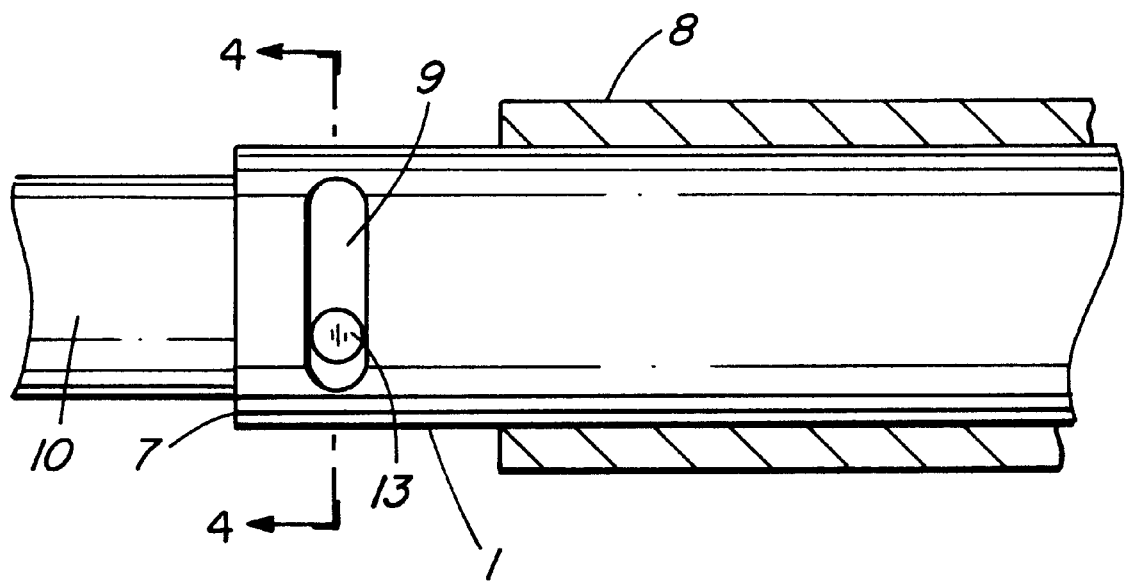
FIG. 3 is an enlarged side view of the handle end of the tubular shaft of the embodiment of FIG. 1.
Figure 4:
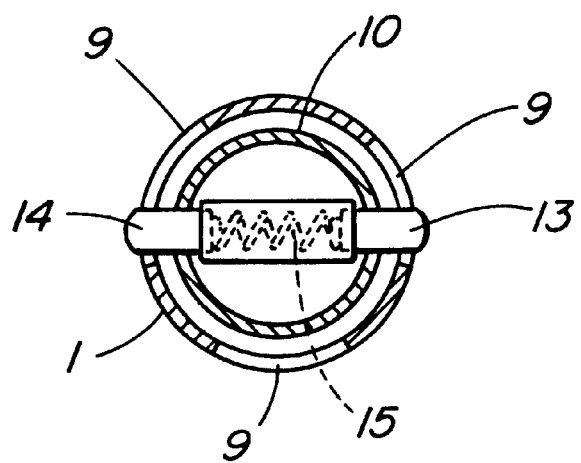
FIG. 4 is a cross sectional view taken along the line 4—4 of FIG. 3.

In FIG. 1, there is shown an elongated tubular metal, preferably, but not essentially, aluminum, shaft 1 typically having an i.d. of about 1.25 inches and a length of between about 32 and 45 inches. A conventional boat hook 2 is rigidly secured, by crimping 5 or rivets etc., to one end of shaft 1. As seen more clearly in FIG. 2, hook 2 is provided with a hollow axial bore 3, through the ball end 4 of hook 2. A ball ended hook 6 is also provided. Adjacent the other end 7 of tubular shaft 1 there is provided a hand grip 8, which may be of rubber, plastic or other conventional grip material, and as seen more clearly in FIGS. 3 and 4, tube 1 is also provided with three slots 9 equally spaced circumferentially therearound adjacent end 7. An inner tubular member 10, typically having a 1 inch o.d, is inserted coaxially into end 7 of tubular shaft 1. A hand grip 11 is provided at the distal end thereof, and a rubber or greased leather washer 12 is provided at the proximal end thereof to act as a piston in tubular shaft 1. A pair of spring loaded buttons or pins 13, 14 actuated by a spring element 15, which may be a conventional coil spring or conventional leaf spring elements. The width of slots 9 is preferably about 10–20% greater than the diameter of pins 13, 14, and the length of each slot 9 is preferably given by the formula $$w = \frac{c}{6} - \frac{d}{3}$$

where w=length of slot
c=circumference of tube 1
d=diameter of buttons 13, 14.

This relationship of length of slot to diameter of pin is generally sufficient to ensure that regardless of the axial relation of tubes 1 and 10, pins 13, 14 will always engage in two of the three slots 9, when tube 10 is extended fully from tube 1.

In operation, when it is desired to pump bilge water or the like, ball end 4 of tube 1 is inserted into the water with tube 10 in the fully closed position inside tube 1 and pins 13, 14 disengaged from slots 9. Pulling on grip 11 to extend tube 10 from tube 1 causes water to be drawn into tube 1 and by lifting end 4 out of the water towards a disposal site, i.e. overboard, and pushing on grip 11 to retract tube 10 into tube 1, the water contained therein is ejected. When is desired to use the invention as a boat hook, tube 10 is fully extended from tube 1 until pins 13, 14 are snapped into engagement with two of the slots 9, thereby locking the tubes 1 and 10 into rigid, but releasable, engagement and providing an extended rigid tubular boat hook which can be used in conventional manner. It will be appreciated that while the locking device 9, 13, 14 has been described with particular reference to a boat hook/bilge pump combination, such locking device may equally well be used between any pair of telescoping tubes which it is desired to lock together at a selected combined length, in either extended or retracted position.

Examples include such uses as umbrellas, tent poles and frames of any shape or configuration.

What is claimed is:

1. An apparatus for securing a pair of telescoping, longitudinally extending, coaxial inner and outer tubular members into a releasable locked position relative to each other comprising: at least one set of three circumferentially arranged slots at a selected position along the length of said outer tubular members, and a pair of radially extendable spring loaded pin members mounted adjacent one end of said inner tubular member and contained within said outer tubular member, such that when said pin members and said slots are in overlying relationship, each of said pair of pin members extends through one of said set of three slots, in any axial orientation of said tubular members.

2. An apparatus as claimed in claim 1 wherein each lot has a minimum length w given by the formula $$w = \frac{c}{6} - \frac{d}{3}$$

where c is the circumference of said outer tube and d is the diameter of said pin member.

3. An apparatus as claimed in claim 2 wherein the length of each said slot is between 1.1 w and 1.2 w.

4. An apparatus as claimed in claim 3 wherein the width of each said slot is 1.1 d.

5. A combination telescopic boat hook and bilge pump comprising: a first tubular longitudinally extending shaft member having hook and nozzle means at a first end thereof; a second tubular longitudinally extending shaft member coaxially mounted in said first tubular member for sliding movement between a first, retracted, position within said first tubular member, and a second position extended from said first tubular member, and having piston means secured to a first end thereof and contained within said first tubular member; said nozzle means, said first tubular member and said piston means defining a variable volume fluid flow path; first tubular member having a set of three equally spaced circumferentially extending slots at a selected position adjacent a second end thereof and said second tubular member having a pair of spring loaded pin members extendable radially outwardly from a position adjacent said piston means, so that when said pair of pin members is moved into overlying relationship with said set of said circumferential slots, said pair of pin members extend radially outwardly through two of said set of three slots, in any axial orientation of said first and second tubular members, to thereby lock said tubular members into a releasable rigid position.

6. A combination boat hook and bilge pump as claimed in claim 5 including grip means at a second end of said first tubular member.

7. A combination boat hook and bilge pump as claimed in claim 6 including grip means at a second end of said second tubular member.

8. A combination boat hook and bilge pump as claimed in claim 5 wherein each said slot has a minimum length w given by the formula $$w = \frac{c}{6} - \frac{d}{3}$$

where c is the circumference of said outer tube and d is the diameter of a said pin member.

9. A combination boat hook and bilge pump as claimed in claim 5 wherein the length of each said slot is between 1.1 w and 1.2 w.

10. A combination boat hook and bilge pump as claimed in claim 5 wherein the width of each said slot is 1.1 d.

11. In a combination telescopic boat hook and bilge pump comprising: a first tubular longitudinally extending shaft member having hook and nozzle means at a first end thereof; a second tubular longitudinally extending shaft member coaxially mounted in said first tubular member for sliding movement between a first, retracted, position within said first tubular member, and a second position extended from said first tubular member, and having piston means secured to a first end thereof and contained within said first tubular member; said nozzle means, said first tubular member and said piston means defining a variable volume fluid flow path; the improvement comprising a set of three equally spaced circumferentially extending slots adjacent a second end of said first tubular member and a pair of spring loaded pin members extendable radially outwardly from a position adjacent said piston means on said second tubular member, so that when said pair of pin members is moved into overlying relationship with said set of said circumferential slots, said pair of pin members extend radially outwardly through two of said set of three slots, in any axial orientation of said first and second tubular members, to thereby lock said tubular members into a releasable rigid position.

\* \* \* \* \*